UNITED STATES PATENT OFFICE.

CECIL O. PHILLIPS, OF NEW YORK, N. Y.

TREATMENT OF COTTON-SEED MEATS.

1,278,076.   Specification of Letters Patent.   Patented Sept. 3, 1918.

No Drawing.   Application filed July 10, 1918. Serial No. 244,294.

*To all whom it may concern:*

Be it known that I, CECIL O. PHILLIPS, a citizen of the United States, residing at New York city, in the county of New York, State of New York, have invented certain new and useful Improvements in Treatment of Cotton-Seed Meats, (Case C;) and I do hereby declare the following to be a full, clear, and exact description of the invention, such as will enable others skilled in the art to which it appertains to make and use the same.

This invention relates to improvements in the extraction of oil from crushed cottonseed meats.

The invention is based upon the discovery that the extraction of oil from cottonseed meats can be materially improved and the amount of oil extracted increased by cooking the ground meats in intimate admixture with a dilute solution of lime water or milk of lime, and by expressing the oil from the resulting cooked meats.

In the extraction of oil from cottonseed, as commonly practised, the seeds are decorticated or hulled and the kernels or meats are separated from the hulls before the oil is extracted. The meats are then ground or crushed and reduced to a finely-divided state and are then subjected to a cooking operation to promote the subsequent expression of the oil, after which the oil is expressed from the cooked meats under a heavy pressure.

The extraction of the oil from the cottonseed meats in this way leaves a considerable portion of the oil in the meats, amounting to around 6% or more.

I have found that the amount of oil left in the meats can be appreciably reduced, and the amount of oil extracted correspondingly increased, by carrying out the cooking operation with a small amount of a dilute solution of lime water or milk of lime intimately combined with the ground meats, so that the meats are subjected to the action of the said solution during the cooking operation.

In the practice of the invention, the dilute solution of lime water or milk of lime is intimately combined with the meats subsequent to their decortication and separation from the major portion of the hulls, and prior to the cooking operation. Inasmuch as the solution is used only in small amounts, for example, three gallons per one-half ton of meats (or the meats from one ton of seed), it is important that the solution should be thoroughly and intimately intermixed with the meats so that their entire mass may be acted upon in a uniform manner.

I have found that the strength and amount of the solution of lime water or milk of lime can be somewhat varied, but that the best results have been usually obtained with a solution of about 5° Baumé containing about five per cent. calcium oxid, and using about three gallons of the solution for the meats from each ton of seed (each ton of seed giving approximately 1300 pounds of meats.)

In the practice of the invention, the seed may be decorticated and the kernels separated from the greater portion of the hulls in any suitable manner such as is commonly employed for the purpose. The meats thus obtained would usually contain less than twenty per cent. of the hulls. The meats may then be crushed or ground in any suitable manner and may be sprayed with a solution either prior to or after the crushing operation; or the solution may be uniformly and intimately distributed throughout the mass of the seed in any suitable manner, so that its action will be thorough and uniform.

The meats are then ready for the cooking operation which may likewise be carried out in common forms of cookers and which will vary somewhat depending upon the nature of the meats and the conditions under which the cooking is carried out. The cooking period may thus vary from fifteen to forty minutes and is commonly carried out in steam-jacketed heaters with a steam pressure of from twenty to one hundred pounds, and with appropriate agitation of the meats during the cooking.

During the cooking operation, the oil becomes more fluid, the albuminous and mucilaginous constituents of the meats are cooked or coagulated, the oil cells expanded, and the meats changed so that the subsequent removal of the oil therefrom is facilitated.

I have found that the utilization of the lime solution above referred to results in a further beneficial modification of the cottonseed meats during the cooking operation so that the subsequent expression of the oil is facilitated and the amount of oil which can be expressed materially increased. The subsequent refining of the oil likewise seems to be promoted by the lime water treatment.

It will be evident that various types and arrangements of apparatus are available for the practice of the invention, and that many of the common types of apparatus may be used without substantial change, provided that the solution is intimately and thoroughly distributed throughout the meats. The solution may thus be added in a continuous manner and continuously intermixed with the crushed meats while they are passing from the crushing rolls to the cooker; the amount of the solution being properly regulated so that a uniform amount may be incorporated with the meats. If the solution is sprayed upon the meats before they pass through the crushing rolls, the crushing operation will assist in the uniform distribution of the solution throughout the meats.

The process of the present invention not only has the beneficial effect in increasing the oil obtainable from the meats but it has the further advantage that the meats themselves are not injuriously affected, but may even be improved by the treatment. The lime is used in such small amount that it has no injurious effect upon the meal, but it may even improve the meal by supplying thereto an added amount of the valuable calcium compounds required in foods.

The process of the present invention can be carried out without any material alteration in the common types of apparatus utilized in the cooking and expression of oil, other than the provision of a storage tank for the lime solution, together with suitable distributing means for spraying or otherwise distributing the lime water upon the cotton seed meats. The solution of lime water above referred to, containing about five per cent. calcium oxid, will contain a considerable part of the lime in a fine state of suspension. This solution and suspension is readily obtainable by the slaking of lime to form milk of lime and by dilution of the milk of lime to the desired extent. In view of the tendency of the milk of lime to settle gradually, a stirrer may be provided in the solution or storage tank to maintain the uniform suspension of the lime and to insure that the solution supplied to the seeds is of uniform and constant composition.

The addition of the lime water solution to the meats enables a somewhat larger amount of moisture to be incorporated with the crushed meats during the cooking operation, and the solution will itself supply this water. It will be evident that the amount of water supplied with the lime, and hence the strength of the lime solution, can be varied so that an increased or decreased amount of water may be supplied, in accordance with the amount desirable with seeds of different kinds, the greener and immature meats tolerating less water than the drier and more mature meats.

I claim:

1. The method of improving the extraction of oil from cottonseed meats which comprises cooking the crushed meats in intimate admixture with a small amount of a dilute solution of lime water or milk of lime, and expressing the oil from the cooked meats; substantially as described.

2. The method of improving the extraction of oil from cottonseed meats which comprises intimately incorporating with the crushed meats a small amount of a dilute solution of lime water or milk of lime, subjecting the resulting meats to a cooking operation, and expressing the oil from the cooked meats; substantially as described.

3. The method of improving the extraction of oil from cottonseed meats which comprises cooking the crushed meats in intimate admixture with a solution of lime water or milk of lime containing about five per cent. of calcium oxid, and about three gallons of the solution being utilized for the meats from each ton of seed, and expressing the oil from the cooked meats; substantially as described.

4. The method of improving the extraction of oil from cottonseed meats which comprises intimately incorporating with the crushed meats a dilute solution of lime water or milk of lime containing about five per cent. of calcium oxid, and about three gallons of the solution being utilized per ton of seed, subjecting the resulting meats to a cooking operation and expressing the oil from the cooked meats; substantially as described.

In testimony whereof I affix my signature.

CECIL O. PHILLIPS.

Copies of this patent may be obtained for five cents each, by addressing the "Commissioner of Patents, Washington, D. C."